(12) United States Patent
Woodsum et al.

(10) Patent No.: US 6,317,388 B1
(45) Date of Patent: Nov. 13, 2001

(54) THERMOACOUSTIC BI-STATIC SONAR SYSTEM

(75) Inventors: Harvey C. Woodsum, Nashua, NH (US); Richard A. Jensen, Andover; Charles A. Carey, Burlington, both of MA (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 06/392,183

(22) Filed: Jun. 28, 1982

(51) Int. Cl.⁷ .................................................. H04B 11/00
(52) U.S. Cl. .............................................................. 367/131
(58) Field of Search .................... 181/0.5, 142; 340/850; 356/5; 367/131, 132, 137, 138

(56) References Cited

U.S. PATENT DOCUMENTS

| | | | |
|---|---|---|---|
| 3,230,506 | * 1/1966 | Hellund | 367/147 |
| 3,243,592 | * 3/1966 | Tomiyasu et al. | |
| 3,392,368 | * 7/1968 | Brewer et al. | 367/142 |
| 3,913,060 | * 10/1975 | Westervelt et al. | 367/142 |
| 4,050,819 | * 9/1977 | Lichtman | |
| 4,137,991 | * 2/1979 | Melcher et al. | 181/142 |
| 4,169,662 | * 10/1979 | Kaule et al. | 181/142 |

OTHER PUBLICATIONS

Gournay, *J. Acous. Soc. Ameri.*, vol. 40, No. 6, 1966, pp. 1322–1330.*

* cited by examiner

*Primary Examiner*—Daniel T. Pihulic
(74) *Attorney, Agent, or Firm*—David W. Gomes

(57) ABSTRACT

This invention is a thermoacoustic sonar system for detecting a target that is located at or beneath the surface of the water. The foregoing system comprises a laser or particle accelerator that is located above the water and a plurality of passive receivers that are located on or above the water. The laser produces a light beam whose amplitude is subsequently modulated or whose pulses are varied in time. A particle accelerator would produce a pulsed particle beam that varies in time. These modulated or varied pulses are focused or deflected to a small layer of water at the air/water interface so that the beam will be absorbed by the water causing the water to produce an acoustic signal that may propagate to a target where the acoustic signal will be reflected and possibly detected by one or more passive receivers.

16 Claims, 2 Drawing Sheets

THERMOACOUSTIC BI-STATIC SONAR SYSTEM

CROSS REFERENCE TO RELATED APPLICATIONS

Reference is made to the following concurrently filed and related patent applications which are assigned to the present Assignee:
1. D-3735 entitled "Thermoacoustic Torpedo Jammer" Ser. No. 06/392,184, filed Jun. 28, 1982 now abandoned;
2. D-3737 entitled "Thermoacoustic Communications System" Ser. No. 06/392,186, filed Jun. 28, 1982; and
3. D-3738 entitled "Steerable Thermoacoustic Array" Ser. No. 06/392,182, filed Jun. 28, 1982.

FIELD OF THE INVENTION

This invention relates to systems for the generation of acoustic signals and more particularly to the generation of acoustic signals at a distance from a generating platform by using thermoacoustic effects.

BACKGROUND OF THE INVENTION

A submarine is a ship that can operate both on the surface of the water and completely submerged. In order to avoid detection by radar, surface ships and air patrols, a submarine is usually submerged. Modern submarines have the capability of remaining submerged for long periods of time. In fact, a modern submarine can circumnavigate the earth while running submerged. Thus, modern submarines may complete large portions of their missions while being submerged. In order to communicate or check the course of their own submarines, Navies want to determine the current location of their own submarines, without revealing the submarine's present location. Navies also want to determine the location of foreign submarines without revealing the location of the Navy's fleet.

One method utilized by the prior art for achieving the foregoing involved the placing of active and passive buoys in the water. The active buoys projected pulses sound into the water. These sound pulses would travel through the water until they hit an object, at which time the sound pulses would be reflected by the object and possibly detected by the passive buoys as an echo. The speed of sound in water is known. Thus, the range and bearing to the unknown object may be determined by triangulating the echoes received by three passive buoys.

For an echo produced by a submarine to be detected by passive buoys, the echo must be of greater strength than the other interfering echoes. The interfering echoes are caused by the noise produced by the passive buoys or by the reverberations produced by the sound generated by the active buoys. Reverberations are all the echoes returned to an active sonar system from the ocean itself. This includes the suspended marine organisms in the ocean as well as the irregularities of the ocean's bottom. A sonar operator will usually hear reverberations as quavering rings and echoes which directly bounce off submarines as pings. Hence, the sonar operator usually was able to distinguish between reverberations and echoes that were directly reflected by submarines.

Unfortunately, echoes do not travel in straight paths in the upper ocean where the active buoys are located. Echoes travel in the upper ocean in curved paths. Thus, the echoes produced by the submarine were usually quite weak (poor target illumination) and it was difficult to locate the submarine. Even though echoes travel in curved paths, it was possible to locate the submarine by triangulation if conditions were just right, i.e. the buoys and submarine must be in the right location for the sound which was produced by the active buoys to be reflected by a submarine and detected by a passive buoy. If no echoes are reflected by a submarine and then detected by the passive buoys, the submarine is not illuminated and its location is unknown. Sometimes, due to the location of the buoys and the submarine, there was an ambiguity in the location of the submarine. According to the detection buoys, the submarine was in two places at the time (physical impossibility). Since the sonar usually did not know the present location of the deployed buoys and he was unable to redirect the sound generated by the active buoys, it was very difficult to resolve the above ambiguity. Other disadvantages of the foregoing systems were that: buoys had a range of approximately one mile and as the submarine traveled the submarine might travel away from the buoy necessitating the dropping of another buoy so that the transmission between the aircraft or surface ship and the buoy might be continued; the active buoys were heavy; if the buoys were carried by an aircraft, the buoys would require a large amount of space and add to the weight of the aircraft which would reduce the amount of other equipment the aircraft would carry and/or reduce the aircraft's range; and the buoys were expendable which meant that the location of a submarine was relatively expensive.

SUMMARY OF THE INVENTION

This invention overcomes the disadvantages of the prior art by creating a sonar system that utilizes a thermoacoustic bi-static source as an active element and passive sensors as passive elements. The active element may be aboard an airborne platform, spaceborne platform or a surface vessel so that its location may be easily changed; and its passive elements may be aboard the aforementioned vehicles or the passive elements may be floating on the surface of the water. Thus, the moveable thermoacoustic source is used to generate acoustic signals from a platform into the water and the passive elements are used to detect the echoes produced by the acoustic source.

The apparatus of this invention utilizes the direct conversion of EM or particle Kinetic energy into acoustic energy by using either a pulsed infrared wavelength laser or particle beam which is fired into the water from an aircraft or satellite. The physical mechanisms producing sound are of two kinds: (1) thermal expansion of the water from heat generated by medium attenuation of a pulse of laser light or impinging particles, or (2) explosive vaporization of a small volume of water when the heat deposited by the laser or particle beam is large enough to raise the local water temperature above boiling threshold. Infrared laser light is usually used because of its high attenuation coefficient in water, which causes high thermal densities. The level of sound produced by infrared lasers is sufficient for communications at expected ranges of communication buoys. Infrared lasers may be controlled (modulated) to the extent required for an underwater communications system. Typical data rates are ~1–10 bits per second.

Modulation schemes which may be employed are on-off keying (OOK), pulse duration modulation (PDM), pulse amplitude modulation (PAM), and frequency shift keying (FSK). The foregoing modulation schemes may be used for lasers and particle beams.

When the density of the heat energy deposited by laser beam absorption is less than that required to vaporize a local volume of water (~2500 joules/cm$^3$) the acoustic pressure at radial distance R and polar angle θ from the beam impact point at the water surface is given by the following expression:

$$P(R, t, \theta) = \frac{k}{2\pi} \int_{-\infty}^{+\infty} d\omega M(\omega)\omega^2 \exp[-j(\omega t - R/c_o)] \cdot \sin\theta$$

where: $k = \beta I_o/(4\pi R c_o C_p)$
   $C_o$=speed of sound
   $C_p$=specific heat of water
   $I_o$=laser power output
   t=time
   β=thermal expansion coefficient of water Here M(ω) is the Fourier transform of the modulation, and $I_o$ the laser power output prior to modulation. The above expression assumes that the useful portion of the acoustic signal is transmitted at a frequency with wavelength smaller than either the beam spot size or absorption depth.

If the modulation is a gaussian pulse $$M(t) = \frac{M_o}{\sqrt{2\pi}\sigma_t} \exp[-t^2/\sigma_t^2]$$

where $\sigma_t$=(one-half of the laser pulse width). The Fourier transform of P(R,θ) is proportional to the function $$F(\omega) = \omega^2 \exp[-\omega^2 \sigma_t^2].$$

The frequency ($\omega_p$) when the spectral energy is the acoustic pulse peak is $$\omega_p = \frac{1}{\sqrt{3}} \sigma_t^{-1}$$

as can be found by setting the derivative of F(ω) equal to zero.

Thus, the duration of the laser pulse ($2\omega_t$) controls the spectral $W_p$. The bandwidth of the signal can be controlled by firing the laser a number of times at a repetition interval less than or equal to the duration of an acoustic pulse produced by a single laser pulse, or by simply lengthening the pulse duration for a single pulse. The pulse amplitude may be controlled and varied by changing the laser power output.

The extremely short 1–10μ absorption length (δ) for certain infrared light frequencies in water makes an explosive vaporization mode of thermoacoustic generation attractive. Incident light with a fluence of >3 J/cm$^2$ ($E_r$) at 10μ wave length, for instance, will instantaneously boil the 10 micron layer in which most of the light is absorbed. This rapid vaporization produces an explosive stress or shock wave (with Fourier transform S(ω)) which eventually propagates through the water as a soundwave (with Fourier transform proportional to ωS(ω)). The internal energy (E) contained in the gas that was vaporized is approximately given by the ideal gas state equation:

E=3/2PV where E is the difference between the laser energy and the threshold energy required to boil the thin layer of water. The initial pressure in the gas bubble would approximately be given by $$P_o = \frac{2}{3} \frac{(E_o - E_T)}{V}$$

where:
   $E_o$=laser pulse energy
   $E_T$=Threshold for vaporization
   V=Volume of fluid in which absorption of light occurs
   V≅Aδ=(spot area)×(laser light absorption depth)
Reasonable values for the spot area (A) and absorption lengths are:
   A=spot area=1CM$^2$=10$^{-4}$m$^2$
   δ=absorption length of fluid=10$^{-5}$m at $CO_2$ laser wavelengths The determination of allowable communication path length requires a knowledge of the spectral level and distribution of the acoustic energy represented by the source strength given above. The duration of the time domain pulse resulting from explosive vaporization of the water surface layer must be estimated to obtain its spectral distribution. Assume the laser pulse is sufficiently short ($\leq 10^{-6}$ sec.) so that all the laser energy is absorbed before the explosive vaporization has appreciably progressed. The time required to expand $10^{-9}$m$^3$ volume of water to 1 ATM gaseous phase is roughly one-half the width of the acoustic pulse produced. The expanded volume of the water is $10^{-6}$m$^3$ based on the roughly $10^3$ difference in density between liquid water and water vapor at 1 ATM. The vapor bubble expands at roughly Mach two in air (2200 m/sec.) forming a spherical segment of volume ~$10^{-6}$m$^3$. The time for the expansion to take place is
   T=4.5 μsec.
at Mach two. The center frequency of the wideband pulse thus produced is $f_o$=(1/(9 μsec))=110 KHz
The spectrum of the thermoacoustic pulse is a roughly 100% bandwidth pulse centered on fo thus with single pulse on-off coding the signal bandwidth is (BW)=110 KHz.

Taking, for example, a 10 joule laser pulse, the peak pressure at the surface is $$P_s = \frac{2}{3} \frac{(E_o - E_T)}{A\delta}$$

$$P_s = \frac{2}{3} \frac{(10 - 3)}{(10^{-4})(10^{-5})}$$

or
   293 dB relative to 1 μPa (re1 μPa)
Assuming spherical spreading from an initial radius ($R_o$) of the source, the source strength at a range R is $$P(R) = P_o \frac{(R_o)}{R} f(\theta)$$

where θ is the horizontal propagation angle, and f(θ) is the source directivity (≈ sin θ). The initial radius can be taken as $V^{1/3}$ where V=$10^{-6}$ m$^3$ so that $R_o$=$10^{-2}$ m. The resulting source strength at 1 meter below the beam impact point (sin θ=1) is then
   SL=20 log P(1)=293−20 log $10^4$
or
   SL=213 dB re (1 μPa)
The standard sonar equation can be used to estimate the excess signal at a distance r meters from the source. In the above example, the spectrum of the acoustic signal is approximately linear with frequency for $\omega > \omega_p$. Thus, the spectrum level (dB//Hz) at 10 KHz (our assumed transmit frequency) is 20 dB below that at 110 KHz. The spectrum level for θ=π/2 rad. at 110 KHz is about 213 dB−10 log $(1.1\times10^5$ Hz)=163 dB//Hz. Therefore, the acoustic spectrum level at 10 KHz≈143 dB//Hz. The sonar equation is inverted to give Figure of Merit (maximum propagation loss) for good communication reliability. This yields (Figure of Merit) FOM=143 −45−12=86 dB=source spectrum level—noise spectrum level—threshold. The signal-to-noise ratio required to reliably detect is assumed to be 12 dB. The range of the signal pulse on-off repetition rate corresponding to an 86 dB FOM is 6 Kyd. Receiving the signal with a directional receiver will increase this range considerably. A practical system calls for bit rates of the order of 1 bit a second or 10 watts of laser power with 10 joule pulses.

An alternate use of the laser energy would be to fire the laser every τ sec to obtain a more narrowband acoustic wave train centered on $\tau^{-1}$. For instance, a ten cycle burst at the same laser power per pulse (10 J) cited above would require 100 joules. The bandwidth would be 11,000 Hz. Thus, if coherent detection could be used, an extra 10 dB of transmission loss could be tolerated.

A particle beam generates acoustic energy by impacting a small region of the surface of the water at the air/water interface. Energy from the aforementioned beam is absorbed by the water which causes the water to be heated. The heating of the water causes thermal expansion which generates pressure or stresses within the water that propagate through the water as a sound wave. The pressure P produced by the particle beam is given by expressions provided above for the thermoelastic energy case with the power flow in the particle beam replacing the laser power in the formulas.

Thus, some of the advantages of the foregoing system are: the active source may be moved in a search mode to optimize the illumination of a target; the active source may be moved to an optimum position to minimize refraction/defraction effects in order to obtain sufficient information to resolve ambiguities in target position; the location of the active source is always known; the frequency, pulse shape and directivity of the active source may be controlled to minimize reflection and reverberation effects; and there are fewer or no expendable and easily detectable components (passive elements).

It is an object of this invention to provide a new and improved bi-static sonar system that utilizes a moveable thermoacoustic source that can be readily positioned in order to optimize the information that is furnished to passive elements.

Other objects and advantages of this invention will become is more apparent as the following description proceeds, which description should be considered together with the accompanying drawings.

DESCRIPTION OF A PREFERRED EMBODIMENT

Figure 1:
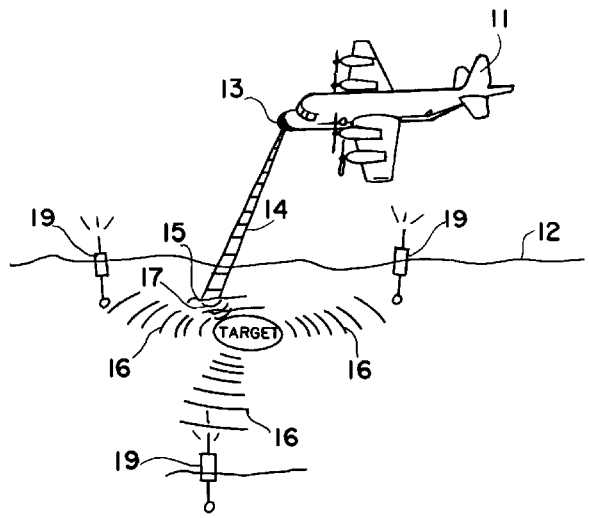
FIG. 1 is a perspective showing the thermoacoustic source of this invention being flown aboard an airborne platform directing a beam on the surface of the water to produce acoustic signals which are detected by passive elements.

Referring now to the drawings in detail, and more particularly to FIG. 1, the reference character 11 represents an airborne or spaceborne platform i.e., aeroplane, helicopter, satellite, that is flying above the water 12. The thermoacoustic source of this invention 13 may be contained within the nose of aircraft 11. Apparatus 13 produces a pulsed electromagnetic or ion beam 14 hereinafter described which is directed at air/water interface 15. Beam 14 will cause approximately a 10 micron layer of interface 15 to be heated causing the generation of acoustic signals 17. Signals 17 may be reflected by target 18 and produce echoes 16 which may be detected by passive elements 19. Target 18 may be a submarine, mine, geological features on the bottom of the ocean, etc. In the event that target 18 is not adequately illuminated by signals 17, or elements 19 reach an ambiguous conclusion regarding the location of target 18, beam 14 may be moved closer to where the sonar operator believes target 18 to be. By moving beam 14 the sonar operator does not cure the problem of sound waves travelling in curved paths in water, however, he can find target 18 by using beam 14 to illuminate different zones of the water to minimize reverberation effects and determine which echoes were reflected by target 18. The location of target 18 may be determined by triangulating the output of elements 19. Elements 19 transmit their output to direction finding equipment (not shown) aboard aircraft 11 via an rf frequency. Acoustic signals 17 may also be generated by having beam 14 introduce enough heat into interface 15 so that the water contained within interface 15 will boil and produce a series of disturbances which are seen as signals 17.

Figure 2:
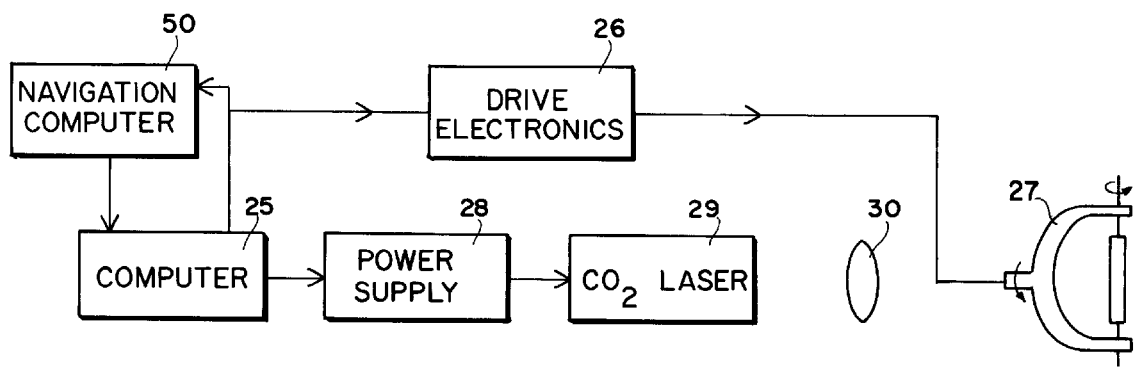
FIG. 2 is a block diagram of a thermoacoustic source that produces time multiplexed acoustic signals.

FIG. 2 shows a thermoacoustic source being used for the generation of time multiplexed signals. Digital computer 25 is coupled to the input of high voltage power supply navigation computer 50 and drive electronics 26. The output of navigation computer 50 is coupled to the input of computer 25. Computer 25 informs computer 50 of the position that the laser beam hereinafter described is going to be directed to. Navigational computer 50 receives an input from some navigational aid, i.e. TELSTAR (not shown) so that computer 50 will know at all times where the laser beam is pointing. Thus, computer 50 transmits the current position of the laser beam to computer 25 and computer 25 informs computer 50 of the direction to which the laser beam is going to be moved.

The output of drive electronics 26 is coupled to the input of steerable mirror 27. The output of power supply 28 is coupled to the input of $CO_2$ laser 29. A $CO_2$ laser is used for generation of thermoacoustic signals because of its high efficiency (10–20%); high power and short absorption length (10μ at 10.6 wavelength) in water; good propagation through bad weather; small reflection layer at the air/water interface and its inability to harm the human eye. Laser 29 is controlled by power supply 28 and computer 25. Computer 25 will turn supply 28 on and off which, in turn, causes laser 29 to be turned on and off. Thus, every time computer 25 wants laser 25 to have an output, power supply 28 would be turned on to pump laser 29, and conversely, when no output was wanted, power supply 28 would be turned off. Hence, laser 28 is turned on and off in such a manner so that the output of laser 29 will be a series of pulses of varying duration. The aforementioned pulses may be used to generate a binary coded signal (which helps a sonar operator localize the location of target 18 (not shown)) i.e., a long pulse may represent a 1 and a short pulse may represent a 0.

The pulses are transmitted to steerable mirror 27. Mirror 27 is controlled by electronics 26 and computer 25 so that the pulses may be directed to lens 30. Lens 30 focuses the aforementioned laser pulse on the surface of the water where the heat of the laser pulses will cause the generation of an acoustic signal by causing a small layer of water at the water/air interface to expand or boil.

This acoustic signal may be reflected by target 18 and detected by elements 19 (not shown).

Figure 3:
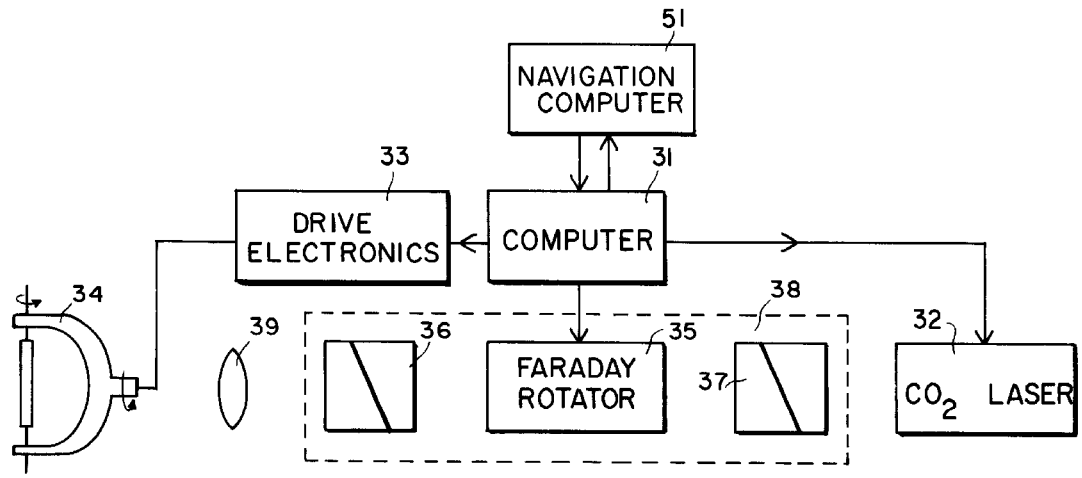
FIG. 3 is a block diagram showing a thermoacoustic source modulating the amplitude of beams to produce acoustic signals.

FIG. 3 depicts the thermoacoustic source of this invention being used to produce acoustic signals by modulating the amplitude of a laser beam. Digital computer 31 is coupled to the input of $CO_2$ laser 32, navigation computer 51, faraday rotator 35 and drive electronics 33. The output of navigation computer 51 is coupled to the input of computer 31. Computer 31 informs computer 51 of the position that the laser beam hereinafter scribed is going to be directed to. Navigational computer 51 receives an input from some navigational aid, i.e. TELSTAR (not shown) so that computer 51 will know at all times where the laser beam is pointing. Thus, the computer 51 transmits the current position of the laser beam to computer 31 and computer 31 informs computer 51 of the direction in which the laser beam is going to be moved.

The output of drive electronics 33 is coupled to the input of steerable mirror 34. Modulator 38 comprises: faraday rotator 35; a polarizer 36 positioned to the left of rotator 35; and a polarizer 37 positioned to the right of rotator 35. When computer 31 transmits a signal to laser 32 and no signal is at the input to rotator 35, laser 32 will output a light beam that will pass through polarizer 37, rotator 35 and polarizer 36. The aforementioned light beam will be transmitted to steerable mirror 34. Mirror 34 is controlled by electronics 33 and computer 31 so that the light beam produced by laser 32 may be directed to lens, 39. Lens 39 focuses the abovementioned beam to the surface of the water where the heat of the laser beam will cause the generation of an acoustic signal by causing a small layer of water at the water/air interface to expand or boil. When computer 31 transmits signal to rotator 35, rotator 35 will rotate the plane polarization of its input light beam 90° so that no light will be output by rotator 35 and polarizer 36. Thus, by controlling the electrical signals transmitted to rotator 35, laser 32, and electronics 33 by computer 31, the beam produced by laser may be modulated in amplitude. This modulated signal may be modulated to produce a coded signal (which helps an operator localize the location of target 18 (not shown)).

Figure 4:
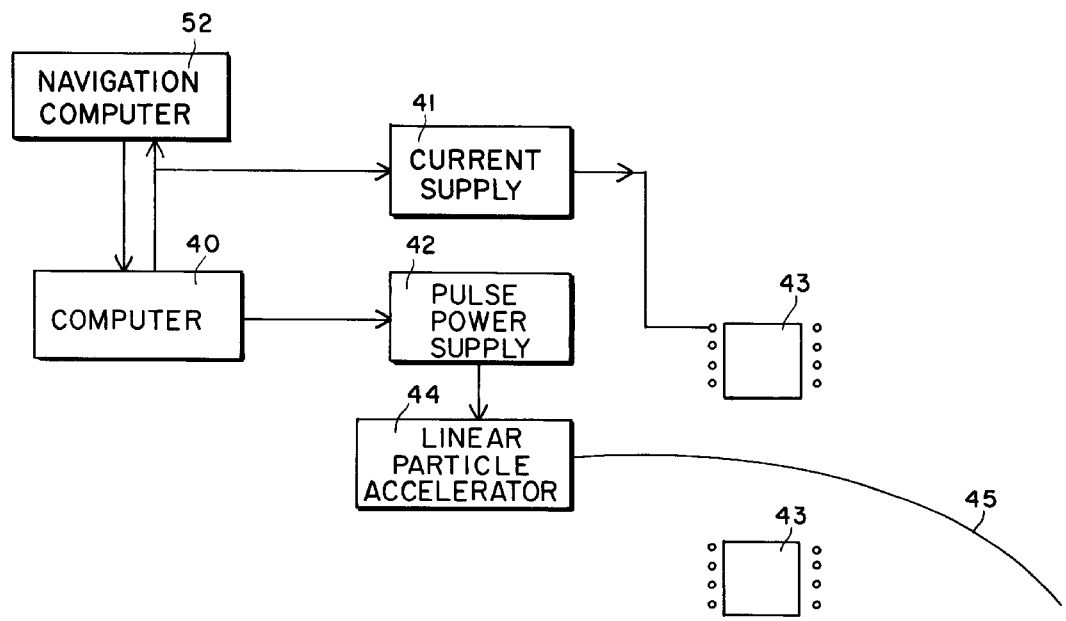
FIG. 4 is a block diagram showing an alternate embodiment of this invention that utilizes a particle accelerator for the generation of acoustic signals.

FIG. 4 shows an alternate embodiment for thermoacoustic source that is used for the generation of a time multiplexed code. Digital computer 40 is coupled to the input of current supply 41, navigation computer 52 and pulse power supply 42. The output of navigation computer 52 is coupled to the input of computer 40. Computer 40 informs computer 51 of the position that the laser beam hereinafter described is going to be directed to. Navigation computer 52 receives an input from some navigational aid, i.e. TELSTAR (not shown) so that computer 52 will know at all times where the laser beam is pointing. Thus, computer 52 transmits the current position of the laser beam to computer 40 and computer 40 informs computer 52 of the direction in which the laser beam is going to be moved.

The output of current supply 41 is coupled to the input of steering coil 43 and the output of power supply 42 is coupled to the input of linear particle accelerator 44. Computer 40 turns power supply 42 on and off in such a manner so that the output of power supply 42 will control the output of accelerator 42. The output of accelerator 42 will be a series of pulses of charged particles 45 that vary in time and duration. Beam 45 will contain coded information which helps a sonar operator localize the location of target 18 (not shown). Beam 45 will pass through steering coil 43 and steering coil 43 will deflect beam 45 to the air/water interface. The heat contained in the particles of beam 45 will heat the water and cause the generation of acoustic signals which may be received and decoded by a detector aboard an object beneath the surface of the ocean. Steering coil 43 deflects beam 45 by producing a magnetic field. The wires that comprise coil 43 run into the plane of the paper and the amount of deflection of particles that comprise beam 45 is determined by the magnitude of the magnetic field. The greater the magnitude of the magnetic field, the greater the deflection of beam 45 and the greater the current that is supplied to coil 43. Thus, computer 40 can determine the path of beam 45 by controlling the amount of current that is supplied to coil 43.

The above specification describes a new and improved thermoacoustic bi-static system. It is realized that the above description may indicate to those skilled in the art additional ways in which the principles of this invention may be practiced without departing from its spirit. It is, therefore, intended that this invention be limited only by the scope of the appended claims.

What is claimed is:

1. A thermoacoustic sonar system for detecting an object that is on or beneath the surface of the water, said system comprising: an amplitude-modulated laser located above the water's surface that produces a directable amplitude-modulated light beam which impinges on a small layer of water at the water/air interface so that said light beam is absorbed by the water substantially immediately adjacent the water/air interface causing the water to expand and produce an acoustic wave of sufficient magnitude to propagate to a target where the acoustic wave will be reflected and possibly detected by one or more passive receivers.

2. A method for detecting a target located at or beneath the surface of the water including the steps of:
   a. varying the time of production and duration of the pulses produced by a linear accelerator located aboard an object above the water's surface in order to produce a signal;
   b. deflecting said pulses at a layer of water at the air/water interface;
   c. heating said layer of water substantially immediately adjacent the air/water interface so that said layer of water will transform the signals produced by said pulses into acoustic signals having sufficient magnitude to propagate through the water and may be reflected by a target; and
   d. detecting the signals that were reflected by the target in order to determine the location of the target.

3. A thermoacoustic sonar system for detecting an object that is on or beneath the surface of the water, said system comprising: an amplitude-modulated laser located above the water's surface that produces a directable amplitude-modulated light beam which impinges on a small layer of water at the water/air interface so that said light beam is absorbed by the water substantially immediately adjacent the water/air interface causing the water to boil and produce an acoustic wave of sufficient magnitude to propagate to a target where the acoustic wave will be reflected and possibly detected by one or more passive receivers.

4. A thermoacoustic sonar system for detecting a target located at or above an air/water interface, said system comprising:

a. a moveable particle accelerator located above the surface of the water;

b. means for changing the output of said accelerator, said means being coupled to said accelerator so that the output of said accelerator will contain information; and c. means for deflecting the output of said accelerator coupled to said changing means, to direct the output of said accelerator to a small layer of water located at the air/water interface so that said layer of water will absorb heat substantially immediately adjacent the air/water interface and transform the information contained in the output of said particle accelerator to acoustic signals having sufficient magnitude to be reflected by a target located at or beneath the water's surface; and d. means for detecting the signals reflected by the target in order to determine the location of the target.

5. The system claimed in claims 1 or 3 wherein said laser is a $CO_2$ laser.

6. The system claimed in claims 1 or 3 wherein said laser is a CO laser.

7. The system claimed in claims 1 or 3 wherein said laser is a DBr laser.

8. A method for detecting a target located on or below the surface of the water including the steps of:

a. modulating the amplitude of a $CO_2$ laser beam that is located in an object above the water's surface in order to produce signals;

b. directing said laser beam at a layer of water at the air/water interface;

c. heating said layer of water substantially immediately adjacent said air/water interface so that said layer of water will convert the light signals produced by said laser into acoustic signals having sufficient magnitude to propagate through the water and may be reflected by a target; and d. detecting the signals reflected by said target in order to determine the location of said target.

9. A thermoacoustic sonar system for detecting a target located in the water at or below an air/water interface, said system comprising:

a. a laser located above the surface of the water;

b. means for changing the output of said laser, said means being coupled to said laser so that the output of said laser will contain information;

c. means for directing the output of said laser coupled to said changing means so that said laser output impinges on a small layer of water located at the air/water interface so that said layer of water will absorb heat substantially immediately adjacent the air/water interface and transform the information contained in the output of said laser to acoustic signals having sufficient magnitude to be reflected by a target located at or beneath the surface of the water; and d. means for detecting said acoustic signals which are reflected by the target so that the location of said target may be determined.

10. The system claimed in claim 9 wherein said directing means comprises:

a. a steerable mirror positioned in front of the output of said laser;

b. means for steering said mirror, the input of said steering means is coupled to the output of said changing means and the output of said steering means if coupled to said mirror; and c. a lens positioned in front of said mirror, so that said mirror may direct the output of said laser to said lens permitting said lens to focus said laser's output on a small layer of water at the air/water interface.

11. The system claimed in claim 10 wherein said laser is a $CO_2$ laser.

12. The system claimed in claim 10 wherein said changing means comprises:

a. a power supply whose output is coupled to the input of said laser, so that when said power supply is turned on said laser will produce a pulse and when said power supply is turned off said laser will not have an output pulse; and b. a digital computer coupled to said directing means and said power supply, said computer will turn said power supply on and off in such a manner to produce laser output pulses that will vary in time and represent a coded signal.

13. The system claimed in claim 10 wherein said detecting means are a plurality of passive transducers.

14. The system claimed in claim 10 wherein said changing means comprises:

a. a faraday rotator positioned in front of the output of said laser;

b. a first polarizer positioned between the output of said laser and said faraday rotator, said first polarizer polarizes the output of said laser;

c. a second polarizer positioned between the output of said faraday rotator and said directing means, said second polarizer polarizes the output of said faraday rotator and directs said output to said directing means; and d. a digital computer coupled to said directing means and said faraday rotator, said computer will modulate the amplitude of the output of said laser by causing said faraday rotator to rotate the output of said laser to produce an output signal that contains information.

15. The system claimed in claim 13 wherein said directing means comprises:

a. a steerable mirror positioned in front of the output of said second polarizer;

b. means for steering said mirror, the input of said steering means is coupled to the output of said computer and the output of said steering means is coupled to said mirror; and c. a lens positioned in front of said mirror so that said mirror may direct the output of said laser to said lens permitting said lens to focus said laser's output on a small layer of water at the air/water interface.

16. The system claimed in claim 10 wherein said steering means comprises drive electronics.

* * * * *